United States Patent

Tunashima et al.

[11] Patent Number: 6,113,873
[45] Date of Patent: Sep. 5, 2000

[54] STABLE ANATASE TITANIUM DIOXIDE AND PROCESS FOR PREPARING THE SAME

[75] Inventors: Makoto Tunashima; Kazuyoshi Muraoka; Kohji Yamamoto; Masaru Mikami; Suzuo Sasaki, all of Akita, Japan

[73] Assignee: Sakai Chemical Industry Co., Ltd., Osaka, Japan

[21] Appl. No.: 09/091,742

[22] PCT Filed: Dec. 27, 1996

[86] PCT No.: PCT/JP96/03843

§ 371 Date: Jun. 24, 1998

§ 102(e) Date: Jun. 24, 1998

[87] PCT Pub. No.: WO97/24288

PCT Pub. Date: Jul. 10, 1997

[30] Foreign Application Priority Data

Dec. 27, 1995 [JP] Japan .................................. 7-351283
Jun. 5, 1996 [JP] Japan .................................. 8-142052

[51] Int. Cl.$^7$ .................................................. C01G 23/047
[52] U.S. Cl. ........................ 423/608; 423/610; 423/615; 423/622; 423/625
[58] Field of Search ...................... 423/598, 608, 423/610, 615, 622, 625

[56] References Cited

U.S. PATENT DOCUMENTS

| | | | |
|---|---|---|---|
| 3,658,539 | 4/1972 | Dantro | 96/88 |
| 4,405,376 | 9/1983 | Matsunaga et al. | 106/300 |
| 4,574,078 | 3/1986 | Cortesi et al. | 423/592 |
| 4,587,308 | 5/1986 | Makita et al. | 525/373 |
| 4,753,829 | 6/1988 | Panush | 427/385.5 |
| 4,758,617 | 7/1988 | Tanioku et al. | 524/413 |
| 4,801,509 | 1/1989 | Uno et al. | 428/513 |
| 4,842,832 | 6/1989 | Inoue et al. | 423/211 |
| 4,880,703 | 11/1989 | Sakamoto et al. | 428/378 |
| 4,927,464 | 5/1990 | Cowie | 106/436 |
| 5,068,056 | 11/1991 | Robb | 252/313.1 |
| 5,235,071 | 8/1993 | Ueda et al. | 549/248 |
| 5,320,782 | 6/1994 | Okuda et al. | 252/520 |
| 5,599,529 | 2/1997 | Cowie | 424/59 |
| 5,630,995 | 5/1997 | Foulger et al. | 423/616 |
| 5,746,961 | 5/1998 | Stevenson et al. | 264/255 |
| 5,766,334 | 6/1998 | Hashizume et al. | 106/403 |
| 5,840,267 | 11/1998 | Saegusa | 423/592 |

*Primary Examiner*—Tom Dunn
*Assistant Examiner*—Cam N. Nguyen
*Attorney, Agent, or Firm*—Birch, Stewart, Kolasch & Birch, LLP

[57] ABSTRACT

To hydrous titanium dioxide obtained by hydrolysis of titanium sulfate was added a predetermined amount of a water-soluble aluminum compound and/or a water-soluble zinc compound, the mixture is calcined, and a suitable amount of aluminum and/or zinc is introduced into the crystals to make up the crystal defects of anatase-type titanium dioxide, so that it has increased stability and excellent color stability.

12 Claims, No Drawings

STABLE ANATASE TITANIUM DIOXIDE AND PROCESS FOR PREPARING THE SAME

This application is the national phase under 35 U.S.C. §371 of prior PCT International Application No. PCT/JP96/03843 which has an International filing date of Dec. 27, 1996 which designated the United States of America, the entire contents of which are hereby incorporated by reference.

TECHNICAL FIELD

The present invention relates to anatase-type titanium dioxide, more particularly to titanium dioxide powder which is bluish and has high whiteness, containing in its crystals minute amounts of aluminum and/or zinc, so that it does not discolor upon high-temperature treatment, is excellent in resistance to light and in weatherability, and has high chemical stability as well as relates to a manufacturing method for manufacturing the same.

BACKGROUND ART

Titanium dioxide is used widely as a white pigment and the like. Titanium dioxide includes two crystallographic systems, i.e., anatase-type one which is of a low-temperature stable phase and rutile-type one which is of a high-temperature stable phase. When used as a pigment, there is made a good use of them according to their characteristics. For example, anatase-type titanium dioxide is characterized in that it is bluish in color tone as compared with the rutile-type one.

Hitherto, anatase-type titanium dioxide has been manufactured by a sulfuric acid method on an industrial scale. This manufacturing method is usually performed by hydrolyzing an aqueous titanyl sulfate solution to produce hydrous titanium dioxide slurry, calcinating the slurry at 850 to 1100° C. to obtain anatase-type titanium dioxide powder having a predetermined particle size.

Such conventional anatase-type titanium dioxide has a problem in that as compared with rutile-type titanium dioxide, it tends to be discolored so that it has low light resistance and low weatherability. More specifically, generally titanium dioxide crystals have more or less partial structural defects and an increase in the structural defects reduces their chemical stability so that when they are used as a pigment, they tend to be discolored due to external energy such as ultraviolet rays, heat, grinding force or the like. The anatase-type titanium dioxide manufactured by the conventional sulfuric acid method has more crystal defects and hence tends to be discolored than rutile-type titanium dioxide. In particular, when titanium dioxide is used as a colorant for plastics, it is a recent trend to use higher kneading temperatures; sometimes the treatment temperature may exceed 300° C. The conventional anatase-type titanium dioxide suffers considerable discoloration at treatment temperatures of 300° C. or higher, thus deteriorating the color tone of the plastics.

The present invention is to solve the above-mentioned problems associated with the conventional anatase-type titanium dioxide and has for its object to provide anatase-type titanium dioxide which has a high degree of whiteness, being difficult to discolor by high-temperature treatments, and has good chemical stability with excellent light resistance and weatherability and to provide a manufacturing method therefor. In the following explanation, sometimes, the state of having a high degree of whiteness, being difficult to discolor by high temperature treatments, and having good chemical stability with excellent light resistance and weatherability is referred to as having high color stability for convenience's sake.

DISCLOSURE OF THE INVENTION

The anatase-type titanium dioxide of the present invention is characterized by (1) comprising in titanium dioxide crystals divalent or trivalent non-colored cations whose hexadentate ion radius is between 0.6 Å or more and 0.9 Å or less, whereby more increased color stability is obtained. As the preferred non-colored cations, (2) at least one of either aluminum or zinc is introduced into the crystal.

The contents of aluminum and zinc introduced into the crystal are suitably (3) 0.02 to 0.4% of aluminum, preferably 0.04 to 0.3% of aluminum, and (4) 0.05 to 1.0% of zinc, preferably 0.1 to 0.6% of zinc, and when the both are used in combination, (5) the sum of the both is 0.02 to 1.0%, preferably 0.04 to 0.6%, and the content of aluminum is 0.4% or less. (6) It is suitable that the titanium dioxide has an average particle diameter of primary particles of 0.01 to 1.0 $\mu$m.

Further, the present invention provides (7) a method for manufacturing titanium dioxide characterized by comprising adding an aluminum compound and/or a zinc compound to hydrous titanium dioxide obtained by hydrolysis of titanium sulfate and calcinating the mixture to form anatase-type titanium dioxide which contains aluminum and/or zinc in the crystal thereof. (8) By this method can be obtained anatase-type titanium dioxide having high color stability, which contains 0.02 to 0.4% of aluminum, 0.05 to 1.0% of zinc, or both aluminum and zinc with the sum of the both being 0.02 to 1.0% with the content of aluminum being 0.4% or less in the crystal thereof.

The above-mentioned manufacturing method of the present invention includes (9) a method comprising dissolving a water-soluble aluminum compound and/or a water-soluble zinc compound in a slurry of hydrous titanium dioxide, drying the slurry, and then calcinating at 850 to 1100° C., and (10) a method comprising mixing aluminum compound powder and/or zinc compound powder with titanium dioxide powder obtained by drying the slurry of hydrous titanium dioxide, and calcinating the mixture at 850 to 1100° C.

BEST MODE FOR CARRYING OUT THE INVENTION (I) Titanium Dioxide of the Present Invention Titanium dioxide crystals have a structure in which six oxygen ions are coordinated to one titanium ion and hence anatase-type crystals are stronger in covalent bonding than rutile-type crystals, which are ionic. The present invention is to increase the color stability of the anatase-type titanium dioxide.

It is assumed that from the crystallographic viewpoint, the discoloration of titanium dioxide is attributable mainly to the incorporation of free electrons generated by crystal defects into tetravalent titanium ions to convert them trivalent titanium (violet color). In order to capture the free electrons, divalent or trivalent metal ions may be doped to titanium dioxide to generate holes; the dopant ions are required to have an ionic radius, which is close to the ionic radius of the tetravalent titanium ion ($Ti^{4+}$: 0.75 Å), and to be selected from non-colored ions in order not to deteriorate the whiteness of titanium dioxide as far as possible.

Since the crystal of titanium dioxide is constituted by hexacoordinate titanium ions ($Ti^{4+}$), the titanium dioxide of the present invention is anatase-type titanium dioxide which has an ionic radius of 0.6 Å to 0.9 Å, which is close to that of hexacoordinate titanium ion ($Ti^{4+}$), and which has increased color stability by incorporation of divalent or trivalent non-colored ions in the titanium dioxide crystal. Note that the above-mentioned ionic radii are values obtained by taking the radii of $O^{2-}$ and $F^-$ as 1.26 Å and 1.19 Å, respectively, and based thereon. According to Table 15.23 at page II-717 of "KAGAKU BINRAN KISO-HEN" (Handbook of Chemistry for Basic), the 3rd Ed., those ions which have ionic radii close to the ionic radius of tetravalent titanium ion include the following ions (the values in the parentheses are of ionic radii of hexadentate ions).

$Fe^{3+}$(0.69 Å), $Co^{3+}$(0.69 to 0.75 Å), $Ni^{2+}$(0.70 to 0.74 Å), $Cu^{2+}$(0.87 Å), $Al^{3+}$(0.68 Å), $Zn^{2+}$(0.88 Å), $Ga^{3+}$(0.76 Å), $Mg^{2+}$(0.86 Å)

Of these, $Fe^{3+}$, $Co^{3+}$, $Ni^{2+}$, and $Cu^{2+}$ are not preferred since they are colored ions. For the purposes of the present invention are suited $Al^{3+}$, $Zn^{2+}$, $Ga^{3+}$, and $Mg^{2+}$. Of these, $Al^{3+}$ and $Zn^{2+}$ are preferred from the viewpoints of effects and economy.

In a preferred embodiment of the present invention, at least one of either aluminum ion or zinc ion is incorporated into titanium dioxide crystal. This makes up crystal defects and increases stability, so that there can be obtained powder, which is difficult to be discolored at high temperatures, has excellent light resistance and weatherability and is strongly bluish and has high brightness.

The amount of aluminum and/or zinc to be incorporated into the crystal is suitably 0.02 to 0.4% as aluminum ion, preferably 0.04 to 0.3% as aluminum ion and/or 0.05 to 1.0% of zinc ion, preferably 0.1 to 0.6% of zinc ion. When aluminum and zinc are used in combination, a suitable range is such that the sum of the amounts of their ions is 0.02 to 1.0%, preferably 0.04 to 0.6% and the amount of aluminum is 0.4% or less.

If the incorporation amount of aluminum or zinc is smaller than the above-mentioned range, there will be obtained only insufficient effects for increasing the chemical stability of titanium dioxide. On the other hand, if the incorporation is larger than the above-mentioned range, free aluminum or zinc in the form of oxides will coexist as mixed with the titanium dioxide particles so that the pigment performances such as opacifying force and brightness are decreased.

Further, the upper limit of the amount of aluminum to be doped is about half that of the doping amount of zinc. This is because, in case of exceeding the additional amounts of aluminum, the particles tend to form hard mass and the dispersibility required for pigments is deteriorated. Zinc has a less tendency toward such.

In addition to those incorporated in the inside of the crystals, some aluminum and zinc are attached to the surface of the particles. The aluminum content and zinc content referred herein relate to the amounts of them incorporated into the inside of the titanium dioxide crystals but do not include the amounts of those attached to the surface of the particles.

Anatase-type titanium dioxides manufactured on an industrial scale include one which contains about 0.01% of aluminum inclusive of that derived from raw material ores or that contaminating during the manufacturing process. However, this amount is not effective in increasing chemical stability (color stability).

Next, the anatase-type titanium dioxide of the present invention has suitably an average particle diameter of 0.01 to 1.0 μm for primary particles. If the average particle diameter of primary particles is below 0.01 μm, the ratio of the surface area that are high in free energy to the total surface area of the particles will increase, causing the particles chemically unstable. On the other hand, the average particle diameter exceeding 1.0 μm is undesirable since basic physical properties required for pigments cannot be maintained. In order to obtain titanium dioxide particles having an average particle diameter of primary particles within the above-described range, there may be performed in the manufacturing method described hereinbelow adjustment of conditions of precipitation upon hydrolysis of titanyl sulfate, adjustment of temperature in the subsequent calcination step or the like adjustment.

(II) Manufacturing Method of the Present Invention

The anatase-type titanium dioxide of the present invention can be manufactured by a sulfuric acid method, in which an aluminum compound and/or a zinc compound in amounts depending on their incorporation amounts (doping amounts) are/is added to the hydrous titanium dioxide obtained by hydrolysis of titanium sulfate and the mixture is calcined.

In the manufacturing method of anatase-type titanium dioxide by a conventional sulfuric acid method, the aqueous titanium sulfate solution obtained by dissolving ores such as ilmenite and titanium slag in sulfuric acid is hydrolyzed to form a slurry of hydrous titanium dioxide, which then is rinsed and dried, and calcined at 850 to 1100° C. to obtain anatase-type titanium dioxide powder.

In the manufacturing method of the present invention, the hydrous titanium dioxide is rinsed and after adjusting the concentration of titanium dioxide in the suspension, an aluminum compound and/or a zinc compound in amounts corresponding to the respective introduction amounts are/is added, and the mixed slurry was calcined after drying.

As the aluminum compound and zinc compound, water-soluble compounds may be added in a wet process or powdery compounds may be added in a dry process. As the water-soluble aluminum compound, there may be used aluminum sulfate and the like, while as the powdery aluminum compound, there may be used alumina and the like. Further, as the water-soluble zinc compound, there may be used zinc sulfate and the like, and as the powdery zinc compound, there may be used zinc oxide and the like.

When the addition is made by a wet process, a predetermined amount of aluminum sulfate, zinc sulfate or the like is dissolved in the above-mentioned slurry of hydrous titanium dioxide, and then the resulting slurry is dried and calcined. The addition by a dry process may be carried out by drying the above-mentioned slurry of hydrous titanium dioxide into powder, mixing it with a predetermined amount of alumina powder and/or zinc oxide powder, and stirring it to disperse uniformly.

In either of the wet or dry manufacturing methods, it is not the case that the total amount of the aluminum or zinc contained in the aluminum compound or the zinc compound added to the titanium dioxide is incorporated into the crystal but the yield of incorporation varies widely depending on the method of addition or mixing as well as calcination and hence it is preferred that the amount of addition be determined depending on these conditions.

In addition to the above, in the manufacturing method for manufacturing anatase-type titanium dioxide on an industrial scale, small amounts of potassium and a phosphorus compound are added before calcination in order to control the particle size and hardness thereof and further to inhibit the production of rutile-type crystals. If the addition of these is omitted, the particle size and hardness will be non-uniform, resulting in loss of the features as a pigment. More specifically, potassium controls the fusion of particles during calcination to reduce fluctuation in particle size. Usually, as the potassium source is used potassium carbonate, which is added in amounts of about 0.2 to 0.5% as potassium carbonate. Phosphorus inhibits the conversion into rutile. Usually, as the source of phosphorus are used ammonium primary, secondary and/or tertiary phosphates, which are added in amounts of about 0.05 to 0.2% as diphosphorus pentaoxide. Instead of potassium carbonate and ammonium primary, secondary and/or tertiary phosphate, there may be added tripotassium phosphate and potassium carbonate. Note that the potassium is washed off in a wet finishing step after calcination.

The slurry or mixed powder of raw materials is calcined at 850 to 1,100° C. If the calcination temperature is below 850° C., the calcination will be performed only insufficiently. On the other hand, if it is above 1,100° C., the brightness and dispersibility required for pigments will be deteriorated considerably because of sintering occurrence in the particles. Calcination at a relatively low temperature for a long period of time rather than that at a high temperature for a short period of time will yield a less amount of sintering to give rise to powder with good dispersibility.

By the above-described manufacturing method, there can be obtained anatase-type titanium dioxide powder which has chemical stability and excellent light resistance.

(III) EXAMPLES

Examples of the present invention are described below. They are only exemplary and shall in no way be construed as limiting the scope of the present invention. In the following examples, the amounts of aluminum and zinc contained in titanium dioxide were measured in the methods described below. The particle diameter was determined by measuring the size of primary particles using transmission-type electron microscope and calculating an average diameter therefrom on a weight basis.

(1) Aluminum Content and Zinc Content on the Surface of Particles 1 g of titanium dioxide particles was mixed with 100 g of 5% hydrochloric acid and extracted with heating and the concentrations of aluminum and of zinc in the extract solution were determined by ICP or the like.

(2) Aluminum Content and Zinc Content Inside the Crystals

To 10 to 15 ml of concentrated sulfuric acid was added 5 ml of concentrated nitric acid. To the mixture was added 1 g of titanium dioxide and the mixture was heated and optionally hydrofluoric acid was added if desired to dissolve titanium dioxide. The concentrations of aluminum and of zinc in the resulting solution were determined by ICP or the like. From the amounts obtained were subtracted the amounts of the aluminum and zinc on the surface of the particles to obtain the contents of aluminum and of zinc contained inside the crystals.

Example 1

Based on the manufacturing method for manufacturing titanium dioxide by a general sulfuric acid method, titanium sulfate was hydrolyzed to obtain hydrous titanium dioxide slurry. After filtration and drying, the slurry was converted to an aqueous dispersion with a titanium dioxide concentration of 33%. To 1,000 g (330 g in terms of $TiO_2$) of the suspension were added 1.3 g of potassium carbonate, 0.7 g of diammonium phosphate, and 0.33 g of aluminum sulfate as aluminum (Al addition ratio:0.10%). After drying, the mixed slurry thus obtained was left to stand in a heating furnace at 800° C. for 1 hour and calcined at 960° C. for 3 hours, and then pulverized to obtain titanium dioxide powder with an average particle diameter of primary particles of 0.20 μm.

The powder was confirmed to be anatase-type titanium dioxide by X-ray diffraction. Further, measurement of the aluminum content of the titanium dioxide powder indicated that the amount of aluminum of the total particle was 0.12%, with the amount of aluminum on the surface being 0.01% and therefore the amount of aluminum contained inside the crystal being 0.11%.

Example 2

Titanium dioxide powder was manufactured under the same conditions as in Example 1 except that the amount of aluminum sulfate added was changed to 1.0% as aluminum (Al addition ratio:0.30%). The total amount of aluminum in the titanium dioxide was 0.31%, with the amount of aluminum on the surface being 0.02% and therefore the amount of aluminum contained inside the crystal being 0.29%. The primary particles had an average particle diameter of 0.23 μm.

Example 3

To 440 g (330 g in terms of $TiO_2$) of powder ($TiO_2$ concentration:75%) obtained by drying the hydrous titanium dioxide slurry used in Example 1 were added 1.3 g of potassium carbonate, 0.7 g of diammonium phosphate, and 0.33 g of alumina powder as aluminum (Al addition ratio:0.10%). The mixture thus obtained was left to stand in a heating furnace at 800° C. for 1 hour, calcined at 960° C. for 3 hours, and then pulverized to obtain anatase-type titanium dioxide powder with an average particle diameter of primary particles of 0.20 μm. Measurement of the aluminum content of the titanium dioxide powder in the same manner as in Example 1 indicated that the amount of aluminum of the total particle was 0.11%, with the amount of aluminum on the surface being 0.04% and therefore the amount of aluminum contained inside the crystal being 0.07%.

Example 4

Titanium dioxide powder was manufactured under the same conditions as in Examples 1 except that the amount of aluminum sulfate added was changed to 0.165 g as aluminum (Al addition ratio:0.05%). The total amount of aluminum in the titanium dioxide powder was 0.05%, with the amount of aluminum on the surface being 0.01% and therefore the amount of aluminum contained inside the crystal being 0.04%. The primary particles had an average particle diameter of 0.18 μm.

Example 5

Based on the manufacturing method for manufacturing titanium dioxide by a general sulfuric acid method, titanium sulfate was hydrolyzed to obtain hydrous titanium dioxide slurry. After filtration and drying, the slurry was converted to an aqueous dispersion with a titanium dioxide concentration of 33%. To 1000 g (330 g in terms of $TiO_2$) of the suspension were added 1.3 g of potassium carbonate, 0.7 g of diammonium phosphate, and 0.80 g of zinc sulfate as zinc (Zn addition ratio:0.10%). After drying, the mixed slurry thus obtained was left to stand in a heating furnace at 800° C. for 1 hour, calcined at 960° C. for 3 hours, and then pulverized to obtain titanium dioxide powder with an average particle diameter of primary particles of 0.20 μm.

Measurement of the zinc content of the titanium dioxide powder indicated that the amount of zinc of the total particle was 0.08%, with the amount of zinc on the surface being 0.01% and therefore the amount of zinc contained inside the crystal being 0.07%. The above-described titanium dioxide powder was confirmed to be of anatase-type by X-ray diffraction.

Example 6

Titanium dioxide powder was manufactured under the same conditions as in Examples 5 except that the amount of zinc sulfate added was changed to 2.40 g as zinc (Zn addition ratio:0.30%). The total amount of zinc in the titanium dioxide powder was 0.29%, with the amount of zinc on the surface being 0.13% and therefore the amount of zinc contained inside the crystal being 0.16%. The primary particles had an average particle diameter of 0.23 μm.

Example 7

To 440 g (330 g in terms of $TiO_2$) of powder ($TiO_2$ concentration:75%) obtained by drying the hydrous titanium dioxide slurry used in Example 1 were added 1.3 g of potassium carbonate, 0.7 g of diammonium phosphate, and 0.80 g of zinc oxide powder as zinc (Zn addition ratio:0.10%). The mixture thus obtained was left to stand in a heating furnace at 800° C. for 1 hour, calcined at 960° C. for 3 hours, and then pulverized to obtain anatase-type titanium dioxide powder with an average particle diameter of primary particles of 0.20 μm.

Measurement of the aluminum content of the titanium dioxide powder in the same manner as in Example 1 indicated that the amount of zinc of the total particle was 0.20%, with the amount of zinc on the surface being 0.12% and therefore the amount of zinc contained inside the crystal being 0.08%.

Example 8

Titanium dioxide powder was manufactured under the same conditions as in Examples 1 except that the amount of zinc sulfate added was changed to 8.0 g as zinc (Zn addition ratio:1.0%). The total amount of zinc in the titanium dioxide powder was 0.95%, with the amount of zinc on the surface being 0.38% and therefore the amount of zinc contained inside the crystal being 0.57%. The primary particles had an average particle diameter of 0.18 μm.

Examples 9~12

Titanium dioxide powder was manufactured under the same conditions as in Example 1 except that aluminum sulfate was replaced by a mixture of aluminum sulfate and zinc sulfate in each example. The amounts of aluminum and zinc contained inside the crystals were measured and the results obtained are shown in Table 1.

Comparative Examples 1~4

Anatase-type titanium dioxide powder was manufactured in the same manner as in Example 1 except that no aluminum sulfated was added (Comparative Example No. 4). Further, anatase-type titanium dioxide powder was manufactured in the same manner as in Example 1 except that the contents of aluminum and/or of zinc were changed as shown in Table 1 (Comparative Examples Nos. 1 to 3).

Method for Evaluating Light Stability

After adding 2 g each of titanium dioxide powder in above-mentioned examples and comparative samples to 1.6 ml of a water-soluble methylolmelamine resin paint and kneading, the mixture was coated on a glass plate with an applicator (4 mil) and dried. The plate was exposed with ultraviolet rays for 8 hours (ultraviolet lamp: SHL-1000UVQ-2 manufactured by TOSHIBA CORPORATION) while rotating the plate on a plane. The color difference of the glass plate was measured before and after the exposure with ultraviolet rays and obtained. For the measurements, a color difference meter as prescribed by JIS-Z-8722 (Color Computer Model SM-5 manufactured by SUGA SHIKENKI CO., LTD.) was used and the color difference was indicated according to the Hunter color-difference equation as prescribed by JIS-Z-8730. The results are shown in Table 1.

Method for Evaluating Brightness 5 g each of the titanium dioxide powders in above-mentioned examples and comparative samples was added to 45 g of polyethylene resin (MIRASON 402, manufactured by MITSUI PETROCHEMICAL INDUSTRIES, LTD.) and after kneading at 150° C. using a two-roll mill, the mixture was molded into 1 mm thick sheet. The brightness of the sheet was measured using the above-mentioned color difference meter. The results are presented in Table 1.

Method for Evaluating Thermal Stability

Polyethylene sheet containing the above-mentioned titanium dioxide was heated at 310° C. for 20 minutes in a small muffle furnace. The sheet was measured using the above-described color difference meter. The color difference between the sheets before and after heating was calculated along the Hunter color-difference equation prescribed by JIS-Z-8370. The results are indicated in Table 1.

As indicated by the results in Table 1, the comparative sample (Comparative Example No.4) corresponding to the conventional titanium dioxide had a great tendency of being discolored since it had a color difference of 2 or more in the light stability test and a color difference of 7 or more in the thermal stability test. On the other hand, the titanium dioxides of the present invention each had a high brightness of 96 or more and a small color difference of 1.2 or less in the light stability test and of 5.7 or less in the thermal stability test, thus confirming that they are excellent in stabilities against light and heat.

Further, the samples with the doping amounts of aluminum and of zinc being below the lower limit used in the present invention (Comparative Samples Nos. 1 to 3) had color differences in light stability and thermal stability close to those of the conventional products, thus showing less improvement effect. On the other hand, the samples with the doping amounts above the upper limit used in the present invention (Comparative Samples Nos. 1 to 3) had each a reduced brightness.

TABLE 1

|  | Manufacturing method | Al/Zn Amounts inside Crystal (%) | Average Particle Diameter (μm) | Light Stability Color Difference ΔE | Brightness | Thermal Stability Color Difference ΔE | Remarks |
| --- | --- | --- | --- | --- | --- | --- | --- |
| Example 1 | wet method | 0.11 | 0.20 | 0.5 | 96.3 | 4.2 | Al-doped |
| 2 | wet method | 0.29 | 0.23 | 0.4 | 96.0 | 3.8 |  |
| 3 | dry method | 0.07 | 0.20 | 0.7 | 96.1 | 5.2 |  |
| 4 | wet method | 0.04 | 0.18 | 0.8 | 96.1 | 5.0 |  |
| Example 5 | wet method | 0.07 | 0.20 | 1.2 | 96.1 | 5.7 | Zn-doped |
| 6 | wet method | 0.16 | 0.23 | 0.7 | 96.2 | 4.7 |  |

TABLE 1-continued

|   | Manufacturing method | Al/Zn Amounts inside Crystal (%) | Average Particle Diameter (μm) | Light Stability Color Difference ΔE | Brightness | Thermal Stability Color Difference ΔE | Remarks |
|---|---|---|---|---|---|---|---|
| 7 | dry method | 0.08 | 0.20 | 1.0 | 96.0 | 5.6 | |
| 8 | wet method | 0.57 | 0.18 | 0.4 | 96.3 | 4.1 | |
| Example 9 | wet method | Al: 0.02 Zn: 0.12 | 0.21 | 1.1 | 96.3 | 5.3 | Al + Zn-doped |
| 10 | wet method | Al: 0.19 Zn: 0.09 | 0.21 | 0.6 | 96.1 | 4.4 | |
| 11 | dry method | Al: 0.06 Zn: 0.48 | 0.20 | 0.7 | 96.1 | 4.7 | |
| 12 | wet method | Al: 0.28 Zn: 0.51 | 0.23 | 0.3 | 96.0 | 3.2 | |
| Comparative Example 1 | wet method | 0.01 0.5 | 0.19 0.25 | 1.9 0.4 | 96.0 95.4 | 7.3 3.6 | Al-doped |
| Comparative Example 2 | wet method | 0.01 1.5 | 0.18 0.24 | 1.8 0.4 | 96.0 95.2 | 8.4 3.5 | |
| Comparative Example 3 | wet method | 0.01 1.5 | 0.19 0.25 | 1.9 0.4 | 96.1 95.2 | 8.6 3.5 | Al + Zn-doped |
| Comparative Example 4 | — | 0 | 0.20 | 2.2 | 95.9 | 9.1 | |

Industrial Applicability

The anatase-type titanium dioxide of the present invention has a higher brightness as compared with the conventional ones and has highly bluish white color which is the most important requirement of anatase-type titanium dioxide. Further, the anatase-type titanium dioxide of the present invention has optimal characteristics as a pigment in which it has very high light resistance so that it is difficult to be discolored. In particular, when kneaded with plastics, its discoloration is inhibited largely at the time of high-temperature treatments as high as about 300° C. Furthermore, according to the manufacturing method of the present invention, there is obtained the above-described titanium dioxide powder having excellent light resistance with ease and economically.

What is claimed is:

1. Anatase-type titanium dioxide composition comprising:
    a) titanium dioxide crystals doped with divalent or trivalent non-colored metal cations;
    b) said cations having a hexadentate ion radius between 0.6 Å or more and 0.9 Å or less;
    c) said titanium dioxide composition having an average particle diameter of primary particles of 0.01 to 1.0 μm; and
    d) said titanium dioxide composition exhibiting increased color stability under high-temperature treatment as high as about 300° C.

2. The titanium dioxide composition as claimed in claim 1 wherein said titanium dioxide composition contains at least one of either aluminum or zinc in the crystal.

3. The titanium dioxide composition as claimed in claim 2 wherein said titanium dioxide composition contains 0.02 to 0.4% of aluminum.

4. The titanium dioxide composition as claimed in claim 3 wherein said titanium dioxide composition contains 0.04 to 0.3% of aluminum.

5. The titanium dioxide composition as claimed in claim 2 wherein said titanium dioxide composition contains 0.05 to 1.0% of zinc.

6. The titanium dioxide composition as claimed in claim 5 wherein said titanium dioxide composition contains 0.1 to 1.0% of zinc.

7. The titanium dioxide composition as claimed in claim 2 wherein said titanium dioxide composition contains both aluminum and zinc, and wherein the sum of both is 0.05 to 1.0% and the content of aluminum is 0.4% or less.

8. The titanium dioxide composition as claimed in claim 7 wherein said titanium dioxide composition contains both aluminum and zinc, and wherein the sum of both is 0.04 to 0.6% and the content of aluminum is 0.4% or less.

9. A method for manufacturing an anatase-type titanium dioxide composition, comprising:
    a) adding an aluminum compound, a zinc compound or mixtures thereof to hydrous titanium dioxide obtained by hydrolysis of titanium sulfate; and
    b) calcinating the mixture to form an anatase-type titanium dioxide composition with increased color stability under high-temperature treatments as high as about 300° C. that contains aluminum, zinc or mixtures thereof in the crystal thereof.

10. The method as claimed in claim 9, wherein said titanium dioxide composition contains 0.02 to 0.4% of aluminum or 0.05 to 1.0% of zinc in the crystals thereof, or both aluminum and zinc with the sum of both being 0.02 to 1.0% with the content of aluminum being 0.4% or less in the crystal thereof.

11. The method for the manufacturing an anatase-type titanium dioxide composition with increased color stability under high-temperature treatment as high as about 300° C. as claimed in claims 9 or 10 comprising:
    a) dissolving a water-soluble aluminum compound, a water soluble zinc compound or mixtures thereof in a slurry of hydrous titanium dioxide;
    b) drying the slurry; and then
    c) calcinating at 850 to 1100° C.

12. The method for the manufacturing an anatase-type titanium dioxide composition with increased color stability under high-temperature treatment as high as about 300° C. as claimed in claims 9 or 10 comprising:
    a) mixing aluminum compound, zinc compound or mixtures thereof with said titanium dioxide obtained by drying said mixture of hydrous titanium dioxide; and
    b) calcinating the mixture at 850 to 1100° C.

* * * * *